United States Patent

[11] 3,556,060

| [72] | Inventor | Edmond Henry-Biabaud<br>Paris, France |
|---|---|---|
| [21] | Appl. No. | 682,924 |
| [22] | Filed | Nov. 14, 1967 |
| [45] | Patented | Jan. 19, 1971 |
| [73] | Assignee | Societe Anonyme Andre CITROEN<br>Paris, France<br>a French body corporate |
| [32] | Priority | Dec. 8, 1966 |
| [33] | | France |
| [31] | | No. 86,659 |

[54] INDUCTION SYSTEM OF INTERNAL COMBUSTION ENGINE
2 Claims, 2 Drawing Figs.

[52] U.S. Cl. .................................................. 123/75,
123/127
[51] Int. Cl. ..................................................F02n 13/06,
F02d 39/02
[50] Field of Search........................................... 123/75B,
127A, 127

[56] References Cited
UNITED STATES PATENTS

| 2,244,214 | 6/1941 | Pescara...................... | 123/75B |
| 2,317,625 | 4/1943 | Mallory..................... | 123/127 |
| 2,430,693 | 11/1947 | Udale......................... | 123/127 |
| 2,460,046 | 1/1949 | Vincent...................... | 123/127 |
| 2,609,806 | 9/1952 | Winkler...................... | 123/127 |

FOREIGN PATENTS

| 1,225,060 | 2/1960 | France ....................... | 123/75B |

*Primary Examiner*—Wendell E. Burns
*Attorneys*—Robert E. Burns and Emmanuel J. Lobato ABSTRACT: A cylinder of an internal combustion engine is provided with an exhaust valve and two inlet valves one of which is controlled in motion to increase the torque at low speed and is fed through an induction passage controlled by a butterfly valve responsive to an accelerator pedal while the other is controlled in motion to increase the power output at high speed and is fed through another induction passage controlled by a butterfly valve automatically responsive to suction in the first-mentioned induction passage. At no time are the first mentioned inlet valve and exhaust valve opened simultaneously.

PATENTED JAN 19 1971  3,556,060

INDUCTION SYSTEM OF INTERNAL COMBUSTION ENGINE

FIELD OF THE INVENTION

This invention relates in general to internal combustion engines and has specific reference to an improved induction system therefor.

DESCRIPTION OF THE PRIOR ART

It is known in internal combustion engines of the carburetor or fuel injection type to provide a plurality of inlet or induction and exhaust valves per cylinder, i.e. at least one exhaust valve and at least two inlet or induction valves. This arrangement is advantageous in that it reduces the inertia of the valve gear while increasing the cross-sectional passage area available for the gases.

In these known arrangements the inlet valves are usually connected to the fuel mixture feed system by means of two different pipes incorporating two throttle valves of the butterfly type respectively, the first butterfly valve being controlled by the accelerator pedal and the second butterfly valve is controlled automatically as a function of the vehicle speed.

This invention is concerned with improvements in this engine induction system with a view to produce a better torque at low engine speeds, reduce exhaust gas toxicity and obtaining a satisfactory power output at high engine speeds.

SUMMARY OF THE INVENTION

To this end, the inlet valve or valves fed through the first butterfly valve (controlled by the accelerator pedal) is determined as a function of a valve lift law adapted to increase the torque at low engine speeds, and the inlet valve or valves fed through the other butterfly valve (operating automatically as a function of an engine operating condition) is determined as a function of another valve lift law adapted to improve the engine power output at high engine speeds.

Furthermore, it is advantageous and in conformity with another feature characterizing this invention to connect the two induction pipes controlled by said butterfly valves respectively to the two chokes of a twin-choke carburetor.

Finally, it is advisable to control the automatic butterfly valve by means of a diaphragm responsive to the vacuum taken in a portion of the induction circuit depending on the accelerator action.

BRIEF DESCRIPTION OF THE DRAWING

Now a typical form of embodiment of an engine according to this invention will be described more in detail by way of example, this engine comprising for example two inlet or induction valves and a single exhaust valve, the inlet valves being connected to a twin-choke carburetor through two different pipes or passages. The inlet valves are independent and each is operated separately.

The attached drawing illustrates diagrammatically in vertical section in FIG. 1 and in horizontal section in FIG. 2 the valve arrangement of a single cylinder of the engine broadly described hereinabove.

DESCRIPTION OF THE PREFERRED EMBODIMENT

Figure 1:
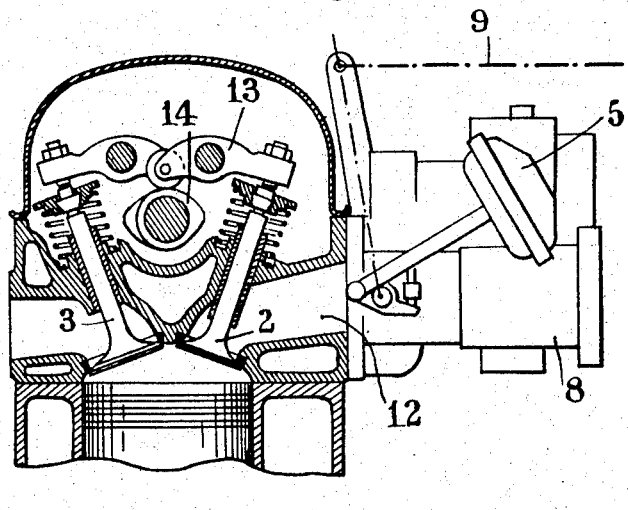
Figure 2:
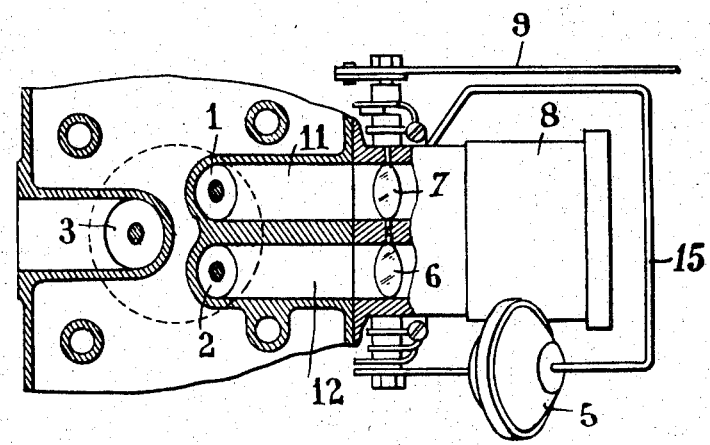

Each inlet valve 1 and 2 is actuated separately in a conventional manner by means of a rocker 13 and a corresponding cam 14. These inlet valves are connected to a twin-choke carburetor 8 through two separate induction pipes or passages 11 and 12.

The air-fuel mixture may be fed either directly from a twin-choke compound carburetor connected to each cylinder, or from a carburetor feeding the cylinders or cylinder groups through two separate induction pipes each connected to one carburetor choke.

The first choke and its induction passage 11 are controlled by a butterfly valve 7 responsive to the accelerator pedal linkage 9; the other choke and its induction passage 12 are controlled by another butterfly valve 6 responsive to a diaphragm 5 shown connected by a conduit 15 with the induction passage 11 in order to be responsive in turn to vacuum taken from a circuit portion depending on the accelerator action.

The law governing the lift of valve 1 is determined with a view to produce a torque increase at low engine speeds and so adjusted that at no time the inlet valve 1 and the exhaust valve 3 are lifted simultaneously, since this would obviously involve a fluid communication therebetween; under these conditions, engine idling is satisfactory and the toxicity of exhaust gas is reduced considerably since no unburnt gas can become mixed therewith.

On the other hand, the law governing the lift of valve 2 corresponding to the other vacuum-controlled pipe or passage 12 is determined with a view to improve the power output at high engine speeds.

The valve gear and the cam contour are obtained according to the conventional methods in accordance with the valve lift laws established for each specific engine.

I claim:

1. An induction system of an internal combustion engine comprising cylinders each having at least one exhaust port and two inlet ports, an exhaust valve controlling said exhaust port, a first inlet valve controlling a first one of said inlet ports, a second inlet valve controlling the second of said inlet ports, carburetor means for supplying a fuel-air mixture for said engine, a first induction passage leading from said carburetor means to said first inlet port for supplying fuel-air mixture to said first inlet port controlled by said first inlet valve, a second induction passage leading from said carburetor means to said second inlet port for supplying fuel-air mixture to said second inlet port controlled by said second inlet valve, a first throttle valve controlling flow of fuel-air mixture in said first induction passage, manually operable means for controlling said first throttle valve, a second throttle valve controlling flow of fuel-air mixture in said second induction passage, diaphragm means responsive to suction in said first induction passage controlling said second throttle means, a first cam actuating said first inlet valve, said cam having a contour to produce valve movement to provide high torque at low engine speeds and to maintain said first inlet valve closed when said exhaust valve is open, and a second cam actuating said second inlet valve, said second cam having a contour which is different from that of said first cam and which produces movement of said second inlet valve to provide high power at high speeds.

2. An induction system according to claim 1, in which said carburetor means comprises a twin barrel carburetor, said first and second induction passages being connected respectively with the respective barrels of said carburetor.